(12) United States Patent
Erwin et al.

(10) Patent No.: US 7,640,457 B2
(45) Date of Patent: Dec. 29, 2009

(54) AUTOMATED ERROR REPORTING AND DIAGNOSIS IN DISTRIBUTED COMPUTING ENVIRONMENT

(75) Inventors: Anthony Wayne Erwin, Rochester, MN (US); Teresa Lynn Greene, Byron, MN (US); Scott Douglas McCreadie, Rochester, MN (US); Andrew James Streit, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 11/557,346

(22) Filed: Nov. 7, 2006

(65) Prior Publication Data

US 2008/0109683 A1   May 8, 2008

(51) Int. Cl.
    *G06F 11/00* (2006.01)
(52) U.S. Cl. .......................... 714/26; 714/31
(58) Field of Classification Search ............ 714/26
    See application file for complete search history.

(56) References Cited

U.S. PATENT DOCUMENTS

| | | | |
|---|---|---|---|
| 5,983,364 A * | 11/1999 | Bortcosh et al. .......... 714/25 |
| 6,000,046 A * | 12/1999 | Passmore .................. 714/57 |
| 6,594,774 B1 * | 7/2003 | Chapman et al. ............. 714/2 |
| 6,742,141 B1 * | 5/2004 | Miller ...................... 714/26 |
| 6,918,059 B1 * | 7/2005 | Galuten et al. ............. 714/31 |
| 7,305,465 B2 * | 12/2007 | Wing et al. ............... 709/223 |
| 2003/0084009 A1 | 5/2003 | Bigus et al. |
| 2003/0084010 A1 | 5/2003 | Bigus et al. |
| 2004/0205034 A1 * | 10/2004 | Bigus et al. ............... 706/10 |

* cited by examiner

*Primary Examiner*—Gabriel L Chu
(74) *Attorney, Agent, or Firm*—Wood, Herron & Evans, LLP

(57) ABSTRACT

An apparatus, program product and method provide a generic error reporting and diagnosis framework that is readily suited for use in a wide variety of distributed computing environments, and that supports the autonomic reporting, diagnosis, and potentially the remediation of errors. The framework supports the encapsulation of symptomatic data associated with an error in a component of a distributed computing environment such that the encapsulated symptomatic data may be routed to an error processing facility, typically irrespective of the underlying nature of the error and the hardware and/or software platform of the component that generated the error. The error processing facility is in turn capable of routing the encapsulated symptomatic data to one or more diagnostic agents that are capable of processing the symptomatic data to prescribe a treatment for the error.

25 Claims, 5 Drawing Sheets

AUTOMATED ERROR REPORTING AND DIAGNOSIS IN DISTRIBUTED COMPUTING ENVIRONMENT

FIELD OF THE INVENTION

The invention is generally directed to computers and computer software, and in particular, to the management of distributed computing systems.

BACKGROUND OF THE INVENTION

Distributed computing systems have found application in a number of different computing environments, particularly those requiring high performance and/or high availability and fault tolerance. In a distributed computing system, multiple computers connected by a network are permitted to communicate and/or share workload. Distributed computing systems support practically all types of computing models, including peer-to-peer and client-server computing.

One particular type of distributed computing system is referred to as a clustered computing system. "Clustering" generally refers to a computer system organization where multiple computers, or nodes, are networked together to cooperatively perform computer tasks. An important aspect of a computer cluster is that all of the nodes in the cluster present a single system image—that is, from the perspective of a client or user, the nodes in a cluster appear collectively as a single computer, or entity. In a client-server computing model, for example, the nodes of a cluster collectively appear as a single server to any clients that attempt to access the cluster.

Clustering is often used in relatively large multi-user computing systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

In many clustered computer systems, the services offered by such systems are implemented as managed resources. Some services, for example, may be singleton services, which are handled at any given time by one particular node, with automatic failover used to move a service to another node whenever the node currently hosting the service encounters a problem. Other services, often referred to as distributed services, enable multiple nodes to provide a service, e.g., to handle requests for a particular type of service from multiple clients.

As distributed computing systems become more complex, administration of such systems can become difficult and time consuming. Distributing computing systems increasingly are called upon to deliver a greater number and wider variety of services, including services provided by a multitude of vendors. Furthermore, the underlying hardware systems incorporated into a distributed computing system may be heterogeneous in nature, including systems of varying capabilities and design, and provided by different vendors.

Traditionally, software and hardware provided by different vendors, and even many components provided by the same vendor, have been managed individually, e.g., using individual management programs, also known as consoles, running locally on specific systems that provide specific services in the distributed computing environment. Dedicated programs for managing different services, however, often rely on different user interfaces and command structures, requiring system administrators to be proficient in multiple dedicated programs. Furthermore, given that distributed computing systems may be geographically dispersed, often a system administrator will need to be on-site in order to effectively manage some of the components in a distributed computing system.

In an effort to simplify the management of complex distributed computing systems, efforts have been made to standardize administration activities, as well as provide remote management programs that enable computing systems to be managed remotely. It would be highly desirable to an enterprise's system administrators if all of the services and hardware in the enterprise's distributed computing systems could be managed through only a few management consoles. In fact, the most desirable situation would be if a distributed computing system could be managed through a single management console. Unfortunately, however, due to the heterogenous and distributed nature of most distributed computing environments, it is rarely the case that this goal can be achieved.

One specific problem that arises in many distributed computing environments relates to the detection, reporting, diagnosis and remediation of errors or error conditions that occur in such environments. Particularly in distributed computing environments where services are dispersed across multiple hardware platforms, and involve the interaction of multiple systems, simply isolating an error to a specific system can be problematic. Even if some form of integrated management console is available to manage multiple systems, and even if an error condition is successfully routed to an integrated management console, a system administrator often will still be required to manually "poke around" (i.e., directly access, interrogate, examine, reconfigure, etc.) one or more individual systems in order to effectively isolate and rectify an error condition.

Efforts have also been directed toward making computer systems more autonomic, i.e., to incorporate self-optimizing, self-protecting, self-configuring and/or self-healing capabilities. Autonomic capabilities often lead to more reliable computer systems due to the fact that potential problems can often be addressed proactively, and often without manual intervention by a system administrator. In many instances, problems may be addressed prior to a computer system experiencing a failure that interrupts any services provided by that computer system.

To the extent that autonomic features have been incorporated into computer systems, however, such features are often tied to specific architectures and limited failure scenarios. As such, conventional autonomic systems have not found widespread acceptance in heterogeneous distributed computing environments that integrate a wide variety of computer systems and provide a variety of services. Therefore, a significant need continues to exist in the art for an improved manner of facilitating the reporting and diagnosis of errors in distributed computing environments.

SUMMARY OF THE INVENTION

The invention addresses these and other problems associated with the prior art in providing an apparatus, program product and method that provide a generic error reporting and diagnosis framework that is readily suited for use in a wide variety of distributed computing environments, and that supports the autonomic reporting, diagnosis, and potentially the remediation of errors. The framework supports the encapsulation of symptomatic data associated with an error in a component of a distributed computing environment such that the encapsulated symptomatic data may be routed to an error processing facility, typically irrespective of the underlying nature of the error and the hardware and/or software platform of the component that generated the error. The error processing facility is in turn capable of routing the encapsulated symptomatic data to one or more diagnostic agents that are capable of processing the symptomatic data to prescribe a treatment for the error.

Some embodiments consistent with the invention support the processing of encapsulated symptomatic data by multiple diagnostic agents having varied domain specific knowledge to broaden the range of errors that may be diagnosed and potentially remediated. Furthermore, some embodiments of the invention support the autonomic execution of treatments prescribed by diagnostic agents to provide self-healing functionality, and with diagnostic agents being granted differing levels of trust to permit more trusted agents to operate with little or no manual oversight by system administrators. Some embodiments also support a secondary user interface in a management application that is under the control of a diagnostic agent, thus enabling a diagnostic agent to interact with a system administrator through a common interface to execute a prescribed treatment.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
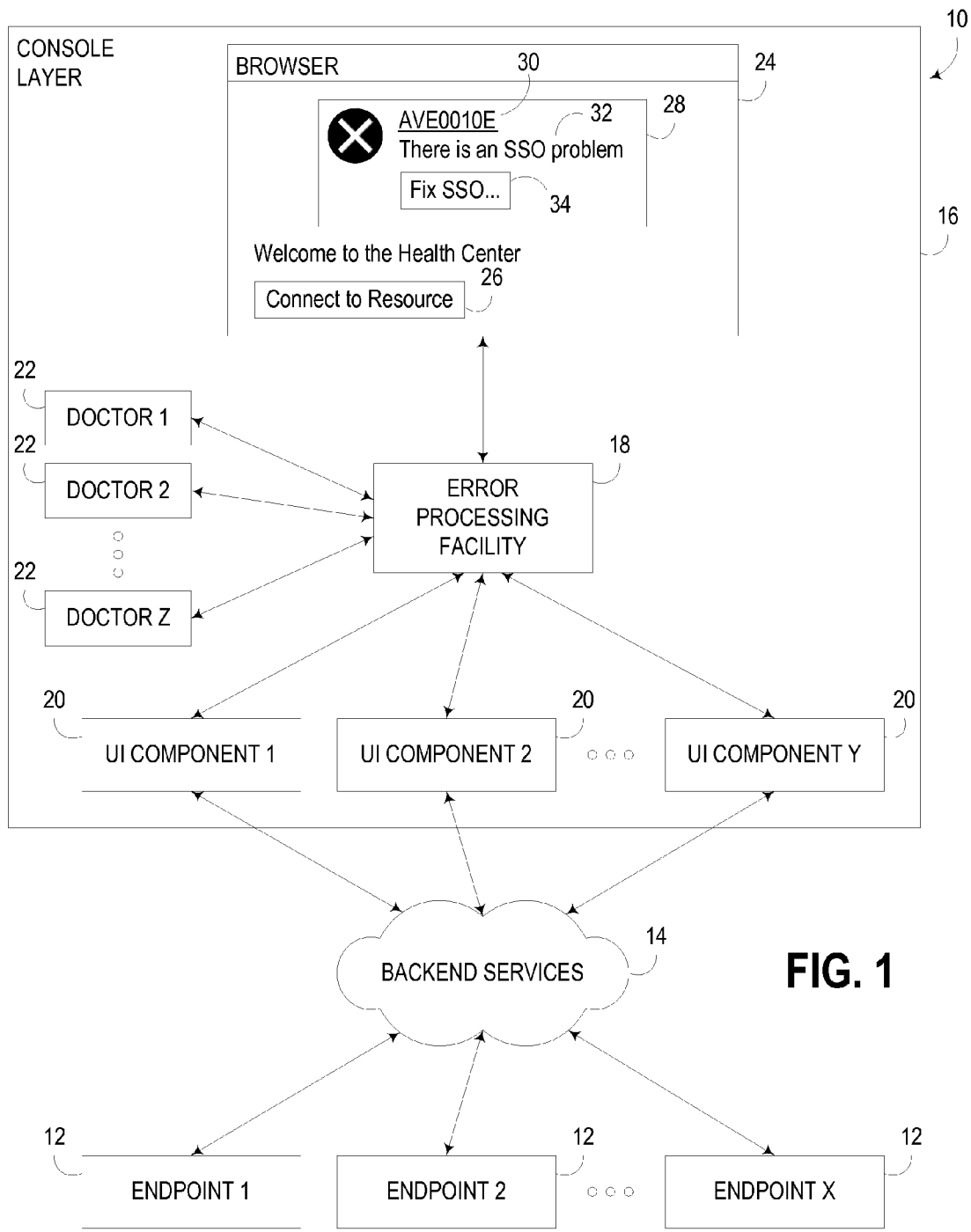
FIG. 1 is a high level block diagram of a distributed computing environment incorporating automated error reporting and diagnosis consistent with the invention.

The embodiments described hereinafter utilize a generic error reporting and diagnosis framework to process errors generated by various components in a distributed computing environment. A component, in this regard, may be considered to include any program code, service, resource, hardware component, or other entity in a distributed computing environment that is capable of experiencing error conditions, and for which it may be desirable to capture, report, diagnose, and (if possible) remedy such error conditions. A component that is managed in an error reporting and diagnosis framework consistent with the invention is typically managed in the sense that error conditions associated with the component may be routed within the framework to an error processing facility. In this regard, a component may also be considered an endpoint within the context of the aforementioned framework.

Embodiments consistent with the invention are readily suited for use in a wide variety of distributed computing environments, and typically support the autonomic reporting, diagnosis, and potentially the remediation of errors. Embodiments consistent with the invention provide in part a framework that supports the encapsulation of symptomatic data associated with an error in a component of a distributed computing environment such that the encapsulated symptomatic data may be routed to an error processing facility, typically irrespective of the underlying nature of the error and the hardware and/or software platform of the component that generated the error. The error processing facility is in turn capable of routing the encapsulated symptomatic data to one or more diagnostic agents that are capable of processing the symptomatic data to prescribe a treatment for the error.

In one exemplary embodiment discussed hereinafter, for example, automated error reporting and diagnosis may be implemented within a Web-based systems management and monitor tool running in the Integrated Solutions Console tool in the WebSphere Portal environment available from International Business Machines Corporation. In such an embodiment, managed components may be resident within any number of WebSphere Portal-based applications, servers, services, J2EE Connector Architecture connectors, etc. In addition, managed components may also be associated with additional backend applications, servers and services, which may be accessed through components provided by the WebSphere Portal environment, or alternatively, accessed independently of the environment. As with any distributed networked application, a variety of error conditions can occur in the illustrated embodiments that significantly hinder (or even eliminate) a user such as a system administrator's ability to monitor and manage a distributed computing environment, e.g., when a server is down, when a web service is not or has not been started, where security credentials are missing or incorrect, where network bandwidth is limited, etc.

In one exemplary embodiment consistent with the invention, for example, a generic framework or architecture includes a management console application that interfaces with a centralized error processing facility. Error conditions generated by managed components or endpoints are routed to the for diagnosis and potentially the recommendation of a prescribed treatment for the error condition. Error conditions will typically vary widely based upon the particular managed resources involved, and may include, for example, software or configuration exceptions, sub-optimal situations detected by monitoring tools (e.g., servers experiencing periodic CPU spikes, etc.), hardware exceptions, network problems, etc. Error conditions may be associated with individual hardware machines, associated with multiple hardware machines, or associated with a network, or associated with a distributed or non-distributed service, application, tool, resource, or other software program code.

The management console application in the exemplary embodiment, which may be web-based, and thus accessible via a conventional web browser, typically provides the mechanism through which a system administrator or other user can manage various resources and services in the distributed computing environment, e.g., to gather data or perform various management operations. A management console application may be integrated with an error processing facility, or in the alternative, either of the management console application and the error processing facility may be implemented as a separate application. Either or both of the management console application and error processing facility may also be distributed in nature.

Error conditions, which may occur within the distributed computing environment, typically result in the creation of an "episode." In addition, during the creation of an episode, symptomatic data associated with the error condition is gathered. Symptomatic data may include any type of information that is potentially useful for the purpose of diagnosing the root cause of an error condition (e.g. the resource encountering the problem, what the resource was trying to do, the type of problem encountered, etc.). Symptomatic data may include system generated data, error messages, log or journal files, user-supplied data, etc. As an example, where an error condition was associated with a single sign on (SSO) application, it may be desirable to gather symptomatic data such as the user trying to authenticate, what system the user was authenticating to, and the type of authentication error (e.g., invalid user password, missing credentials, etc.).

An episode, along with the symptomatic data, is then encapsulated, or wrappered, within a generic format exception object that is decipherable by the error processing facility. It will be appreciated that encapsulating or wrappering symptomatic data may occur in a number of manners that will be appreciated by one of ordinary skill in the art having the benefit of the instant disclosure. For example, encapsulating symptomatic data may take the form of inserting the symptomatic data into a common exception object format that is readable by an error processing facility. Encapsulating systematic data may also take the form of embedding the symptomatic data within a defined file format, e.g., in an XML format.

Once created, exception objects in the exemplary embodiment are then routed to the management console application. In this manner, a wide variety of error conditions can be encapsulated and sent in a common format to the error processing facility, without concern for any platform-specific characteristics of the error condition.

The error processing facility in the exemplary embodiment has at its disposal a dynamic set of exception "doctors," or diagnostic agents, which process exception objects and attempt to diagnose the causes of error conditions and recommend or prescribe treatments thereto. During diagnosis, each diagnostic agent or doctor typically analyzes the actual error messages embedded in the exception objects as well as any other information incorporated in the exceptions' symptomatic data.

Doctors may be provided with different domain specific knowledge such that different approaches, different algorithms, different expertise, etc., may be used to diagnose the cause of a given error condition. Doctors may be implemented, for example, as intelligent agents, and may include various types of algorithms, including, among others, neural network-based algorithms. Doctors may be configured to merely diagnose error conditions and recommend or prescribe treatments, or they may also be capable of executing treatments directly. Doctors may also be capable of interacting with a user to obtain additional information, perform certain tasks associated with a treatment, obtain authorization, etc. Doctors may also be capable of working collaboratively with one another, and may including learning/adaptive capabilities.

If any of the doctors in the exemplary embodiment returns a "prescription" that will treat the problem, then the error processing facility in the exemplary embodiment typically displays an appropriate message to the user and facilitates treatment via the execution of the prescription. The treatment may take place in one of several ways based on a user-specified level of trust in the individual doctors. For example, if the user level of trust is high enough and the doctor is confident it can fix the problem without user intervention, then the doctor may be empowered to do so without additional user authorization. For example, if a web service is down, a doctor might be allowed to just go ahead and invoke the necessary commands on the target server to bring the web service back up. Or, if CPU usage is not balanced, a workload balancing tool could be invoked to adjust workloads accordingly.

On the other hand, if the level of trust for a doctor is low and the doctor is confident it can fix the problem without user intervention, then the doctor may be permitted to ask the user if it may proceed with its desired course of action, and invoke the prescription only after receiving such authorization.

As another alternative, if a doctor has the expertise to fix the problem but needs additional user input (e.g. an incorrect password is causing a series of authentication errors), then the doctor may be permitted to query the user for additional input, e.g., by launching one or more corrective action dialogs.

If no doctors can treat the problem, then the error processing facility in the exemplary embodiment may simply display a globalized error message contained in an exception object.

It will be appreciated that the concept of "trust" with respect to doctors may vary in different embodiments. Trust may be statically defined by a developer, vendor, customer, or system administrator, and may or may not be modifiable. Trust for a particular doctor may also be dynamically modifiable, e.g., based upon the tracked performance of the doctor over time.

It will be appreciated that the steps that are performed in a doctor-implemented treatment may vary in different embodiments. For example, a treatment may incorporate the calling of functions, services, tools, applications, methods, etc. one or more computer systems, the updating of configuration data on one or more computer systems, the restarting or shutting down of computer systems or services, the interrogation of a user for additional data, the interrogation of a computer system or service for additional data, the instruction of remedial operations to be undertaken manually by a user, the suggestion of hardware modifications, updates, component replacements, or practically any other steps that may be used to remedy an error condition.

The aforementioned exemplary framework provides a number of potential benefits. For example, users may be given detailed information about the problems interfering with the use of their distributed applications and other services. In addition, problems throughout an enterprise can potentially be fixed by a user without ever leaving the management console application to go to other system or service-specific console GUI's or command line interfaces.

In addition, each doctor can be configured as a "specialist" containing domain specific knowledge (e.g. a networking doctor, security doctor, etc.) and use any tools it desires to analyze the problem and determine the cause, including the Agent Building and Learning Environment (ABLE) or any other artificial intelligence toolkit. Doctors may also be allowed to provide their own dialogs and wizards to collect additional input from a user if necessary. In the exemplary embodiment, for example, secondary user interfaces may be supported within a management console application and run modally within the application where the problem occurred. The doctor user interfaces may be written, for example, in the Abstract User Interface Markup Language (AUIML) toolkit (a user interface-neutral rendering technology) for use on a wide variety of heterogeneous platforms.

It may also be desirable in some embodiments to enable the set of available doctors to be dynamically modified, e.g., so that doctors can be added, removed, updated, etc., from the pool of doctors available to an error processing facility. By doing so, customers or third-party vendors could potentially write their own doctor implementations to plug in to and otherwise extend the functionality of the framework.

It may also be desirable to permit a doctor to "triage" an entire set of error conditions and determine one or more root causes common to those error conditions. By doing so, a user may be saved from having to wade through dozens (or hundreds) of extraneous problems that might be reported from across a system.

The creation of episodes, along with the collection of symptomatic data, the encapsulation of the symptomatic data in an exception object, and the routing of the exception object to the management console application may be implemented directly within a component or endpoint. However, in many instances, it is desirable to shield component programmers from the need to implement these functions, as well as from the need to directly invoke doctor analysis and treatment. In such instances, it may be desirable to provide utility methods associated with the framework and accessible by components to enable components to simply call an appropriate utility method in essentially the same manner that would be required when a component merely wanted to display an error message. As a consequence, component programmers would not be required to do any causal analysis, problem determination, or extra work associated with error reporting and diagnosis. In fact, in some instances, should standard utility methods be supported in a system to display error messages, these utility methods may be replaced with those associated with the framework to enable the framework to receive episodes associated with a component without any specific functionality in the component having an awareness of or programming that is specific to the framework.

In some embodiments, component programmers may also be allowed to attach treatment listeners when calling a utility method, so that the components may be notified if a treatment was successful, if a treatment was attempted but may or may not have been successful, if a treatment failed, etc. Such information could then be used to rerun offending operations (if applicable).

Other modifications and additional capabilities will be apparent to one of ordinary skill in the art having the benefit of the instant disclosure.

Turning now to the drawings, wherein like numbers denote like parts throughout the several views, FIG. 1 illustrates an exemplary embodiment of a distributed computing environment (DCE) 10 incorporating an automated error reporting and diagnosis framework consistent with the invention. DCE 10 includes a plurality of endpoints 12 that are accessible through one or more backend services 14. A management console application, or console layer 16, is used to manage endpoints 12 and backend services 14. In this embodiment, for example, endpoints 12 can include components such as servers, agents running on the servers, etc., while backend services 14 can include services such as J2EE Web Services, LDAP Repositories, JCA Connectors, etc.

An error processing facility 18 in console layer 16 interfaces with components 12 and backend services 14 through one or more user interface (UI) components 20. UI components 20 may be dedicated to specific endpoints or services, or may be dedicated to specific types of endpoints or services. Generic UI components may also be provided to handle more generalized interactions. Furthermore, UI components may cooperatively operate with one another in connection with the management of endpoints and services.

UI components may be used to interact with endpoints or services, e.g., to request status or health information from endpoints/service, perform management operations on endpoints/services, retrieve lists of items (other endpoints, applications, hardware, etc.) to display to the end user (and allow the user to take further actions on them), retrieve data to build graphical topologies, retrieve properties to display to the user, etc. UI components in the illustrated embodiment are implemented as JSR-168 portlets using J2EE running in a portal environment. UI components may also be configured as plug-in components for error processing facility 18, and thus may be added, removed, or modified as necessary to tailor the framework for use in a particular environment.

Error processing facility 18 also includes a set of diagnostic agents, or doctors 22, which are used to process error conditions and symptomatic data associated therewith and attempt to diagnose the causes of error conditions and recommend or prescribe treatments thereto. As with the UI components, doctors 22 may be implemented as plug-ins, and may be added, removed or modified/replaced as desired to tailor the framework for a particular environment. For example, doctors may be implemented using Java, and may, for example, run in the same Java Virtual Machine as the UI Components. In addition, it may be desirable to permit the set of active doctors to be dynamically modified during runtime.

Console layer 16 includes additional functionality (not shown separately in FIG. 1) to coordinate the performance of management operations on endpoints 12 and services 14. Console layer 16 may also utilize one or more UI components 20 to perform desired management operations.

FIG. 1 also illustrates an exemplary web page 24 generated by error processing facility 18. In the illustrated embodiment, system administrator access to console layer 16 is provided via a web-based interface. As such, error processing facility 18 typically includes functionality to generate web pages to interact with a system administrator or other user on a remote computer. In the exemplary web page 24, for example, one or more user interface controls 26 are illustrated for performing various management operations on endpoints and services in DCE 10. In addition, web page 24 is shown incorporating a secondary user interface, e.g., presented in the form of a dialog box 28, that is controlled by a doctor 22 and used to interact with a user in order to prescribe, and potentially execute, a treatment in response to an error condition.

In the illustrated embodiment, error conditions, generated in endpoints 12 or services 14, are routed via one or more UI components 20 to error processing facility 18. Facility 18 in turn routes symptomatic data associated with the error conditions to one or more doctors 22 for diagnosis and prescription of a treatment. If a doctor 22 is able to diagnose an error condition and prescribe a treatment, the doctor may be permitted to interact with a user via a user interface 28 to remedy the error condition.

As one example of the type of management operation that may be performed in DCE 10, consider the situation where a user, interacting with console layer 16, desires to connect to a particular resource or endpoint 12, e.g., endpoint X. A user may initiate such an operation by clicking on button 26 in web page 24, which results in an attempt being made to connect to endpoint X through backend services 14. In this example, assume that a single sign on (SSO) application in DCE 10 is not properly configured to connect to endpoint X (e.g., because no association exists for the endpoint for the current user, there is an incorrect or missing password for the endpoint, the user doesn't have proper authority to perform the operation requested, etc.). As a result, the connection attempt may result in the generation of an error condition, which is wrapped in an exception object along with symptomatic data (e.g., the error message).

The exception object is then routed through backend services 14 to an appropriate UI component 20 (e.g., UI component Y), which subsequently routes the exception object to error processing facility 18. Facility 18 then routes the exception object to one or more doctors 22 for diagnosis. One of doctors 22, e.g., doctor Z, may be configured as an SSO-specific doctor, and as a result, may be able to properly diagnose the error condition. The doctor may be configured to then interact with the user to remedy the problem. For example, as shown by dialog box 28, doctor Z may be able to report both an error identifier 30 and an associated natural language error message 32 to the user to report the error condition. In addition, doctor Z may be permitted to interact with the user via one or more user interface controls, e.g., button 34, to rectify the problem. In the case of an SSO error, the doctor may attempt to request the appropriate password from the user and update the SSO application, attempt to reconfigure the SSO application to change the user's authority and/or update the user's access rights, or perform other appropriate actions for addressing the problem.

Figure 2:
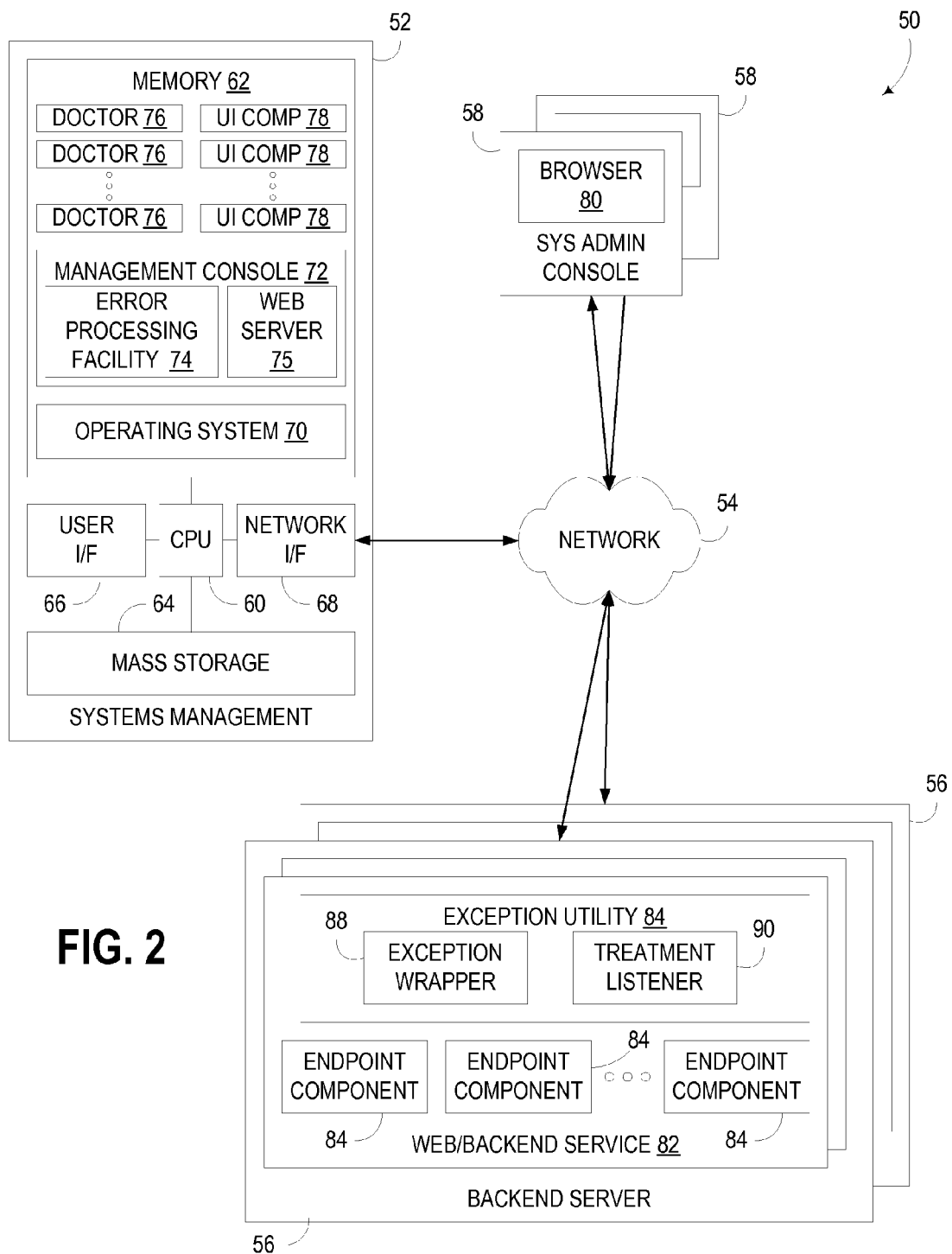
FIG. 2 is a block diagram of an exemplary hardware and software environment for a distributed computing environment incorporating automated error reporting and diagnosis consistent with the invention.

FIG. 2 next illustrates an exemplary hardware and software environment for a distributed computing environment 50, and similar in nature to DCE 10 of FIG. 1. DCE 50 as shown includes a systems management computer 52 coupled over a network 54 to a plurality of server computers 56, as well as a plurality of system administrator console computers 58.

Systems management computer 52 and server computers 56 are typically implemented, for example, as any of a number of multi-user computers such as network servers, midrange computers, mainframe computers, etc. Each system administrator console computer 58, on the other hand, is typically implemented as any of a number of single-user computers such as workstations, desktop computers, portable computers, and the like. It will be appreciated, however, that any of computers 52, 56, 58 may alternatively be implemented using various multi-user or single-user computers, as well as in various other programmable electronic devices such as handheld computers, set top boxes, mobile phones, etc.

Computer 52 generally includes a central processing unit (CPU) 60 including one or more system processors and coupled to a memory or main storage 62, typically through one or more levels of cache memory (not shown). Furthermore, CPU 60 may be coupled to additional peripheral components, e.g., mass storage 64 (e.g., a DASD or one or more disk drives), various input/output devices (e.g., a control panel, display, keyboard, mouse, speaker, microphone, and/or dedicated workstation, etc.) via a user interface 66, and one or more networks 54 via a network interface 68. Each computer 56, 58 is typically configured in a similar manner, although computer 58 are typically lower performance, single-user computers. Any number of alternate computer architectures may be used for any of the computers in DCE 50 in the alternative.

Systems management computer 52 executes an operating system 70, as well as a management console application 72 that includes an error processing facility 74 and web server 75. In addition, a plurality of doctors 76 and UI components 78 are resident in computer 52 for use by application 72, as discussed above in connection with FIG. 1. A standard browser 80 executes in each computer 58, whereby interaction with the systems management computer 52 by a system administrator or other user is managed through dynamic web pages served by web server 75. In the alternative, a dedicated client application may be resident on each computer 58, if desired.

Each server computer 56 hosts one or more web or backend services 82, each of which including one or more endpoint components 84. In addition, from the perspective of the aforementioned framework, each server computer 56 hosts one or more exception utilities 86 that are used to interface the endpoints with the framework. Desirably, each utility 86 provides an interface for use by endpoints to report error conditions, and optionally, receive feedback on the resolution of such error conditions. As such, each utility 86 includes an exception wrapper 88 that is called in response to an error condition in an endpoint 84 by capturing symptomatic data associated with an error condition, wrappering the symptomatic data in an exception object, and routing the exception object to error processing facility 74. Each utility 86 may also include a treatment listener 90, with which an endpoint 84 may register to receive feedback on the resolution of a reported error condition. As such, an endpoint may be able to receive an indication of whether an error condition was appropriately resolved, e.g., so that the endpoint can retry a failed operation.

By providing a separate utility 86 for handling error reporting, developers of endpoint components are typically freed from having to address analysis and treatment of error conditions. In fact, in some embodiments, endpoint components may simply call a method in a utility 86 in much the same way that an endpoint component would ordinarily call a method to display an error message. Utilities 86 may be dedicated to particular endpoints or types of endpoints, or may be generic to all endpoints on a given computer. Utilities may also be distributed and executing on different computers than the endpoint components managed thereby. Furthermore, in some embodiments, endpoint component developers may incorporate the functionality of a utility directly within a component if desired.

The discussion hereinafter will focus on the specific routines utilized to implement the above-described policy management functionality. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Figure 3:
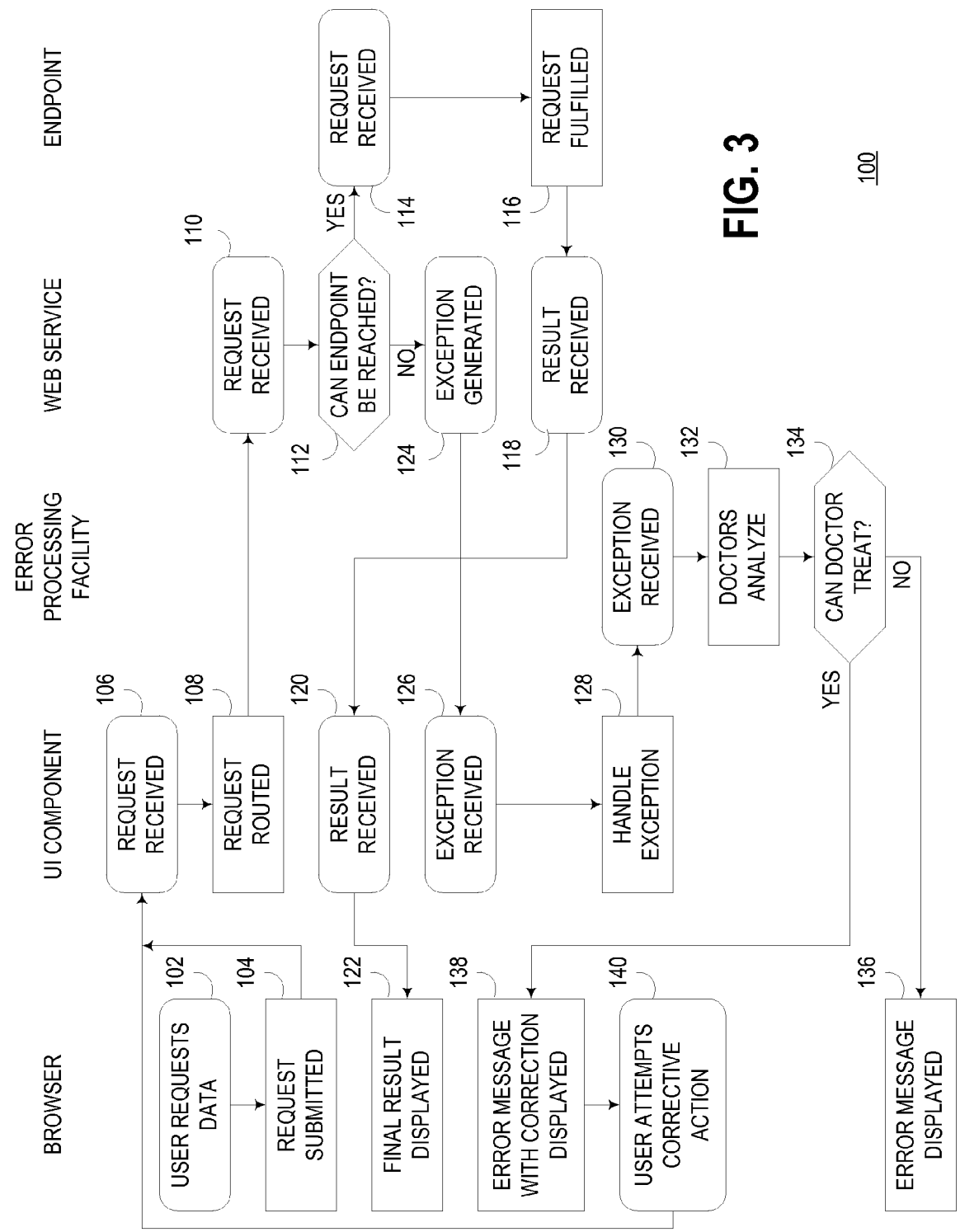
FIG. 3 is a flowchart illustrating the interaction between components in connection with reporting and diagnosing errors in the distributed computing environment of FIG. 2.

FIG. 3 next illustrates via process 100 the interaction between the various components in the aforementioned framework in connection with reporting and diagnosing errors in the distributed computing environment of FIG. 1 or 2. In particular, process 100 shows the interaction between a user browser, a UI component, an error processing facility, a web service and an endpoint in the aforementioned framework, in particular in connection with a user attempting to access data from an endpoint via the management console application. It will be appreciated that other management operations may be performed in a similar manner. It will also be appreciated that error conditions that occur in endpoints may be routed to an error processing facility independent of any attempt to access an endpoint. As such, the invention is not limited to the specific process illustrated in FIG. 3.

In this process, it is assumed that a user wishes to access data from an endpoint via the management console application. As such, the user requests the data in block 102 via interaction with an appropriate user interface control displayed in the browser. As a result of this operation, the request is submitted by the browser as shown in block 104, with the request received by the appropriate UI component in block 106. The UI component then routes the request to the appropriate web service in block 108, with the receipt of such request illustrated in block 110.

Upon receiving the request, the web service attempts to determine in block 112 whether the endpoint can be reached, e.g., by attempting to connect to the endpoint. Assuming that under ordinary operation, this attempt is successful. As such, the request will be received by the endpoint as illustrated at block 114. The endpoint then fulfills the request in block 116 and returns the result to the web service (block 118). The web service routes the result back to the UI component (block 120), which then routes the result onto the user browser, where the result is displayed at block 122.

Returning to block 112, however, if the endpoint is not reachable, e.g., due to an unsuccessful connection attempt, block 112 passes control to block 124 to generate an exception object, in the manner described above. The exception object is received by the UI component in block 126, which handles the exception object in block 128 by routing the exception object to the error processing facility (block 130).

The error processing facility then forwards the exception object to the set of active doctors to analyze the exception object (block 132). In response, one or more of the doctors may return an indication to the error processing facility indicating that the doctor can treat the error condition. If no doctor returns such an indication, block 134 the error processing facility causes the browser to simply display an error message (block 136). Otherwise, if a doctor does indicate that the error condition is treatable, the error processing facility, and in particular the doctor capable of treating the error condition, causes the browser to display an error message along with the potential correction (block 138). In addition, as shown in block 140, the user may attempt to perform a corrective action under the direction of the doctor. Subsequent to the corrective action, the request may be reinitiated, such that the request is once again received by the UI component in block 106 and routed to the endpoint as discussed above in connection with blocks 108-112. If the error has been corrected, the request will be processed normally as discussed above in connection with blocks 114-122.

Figure 4:
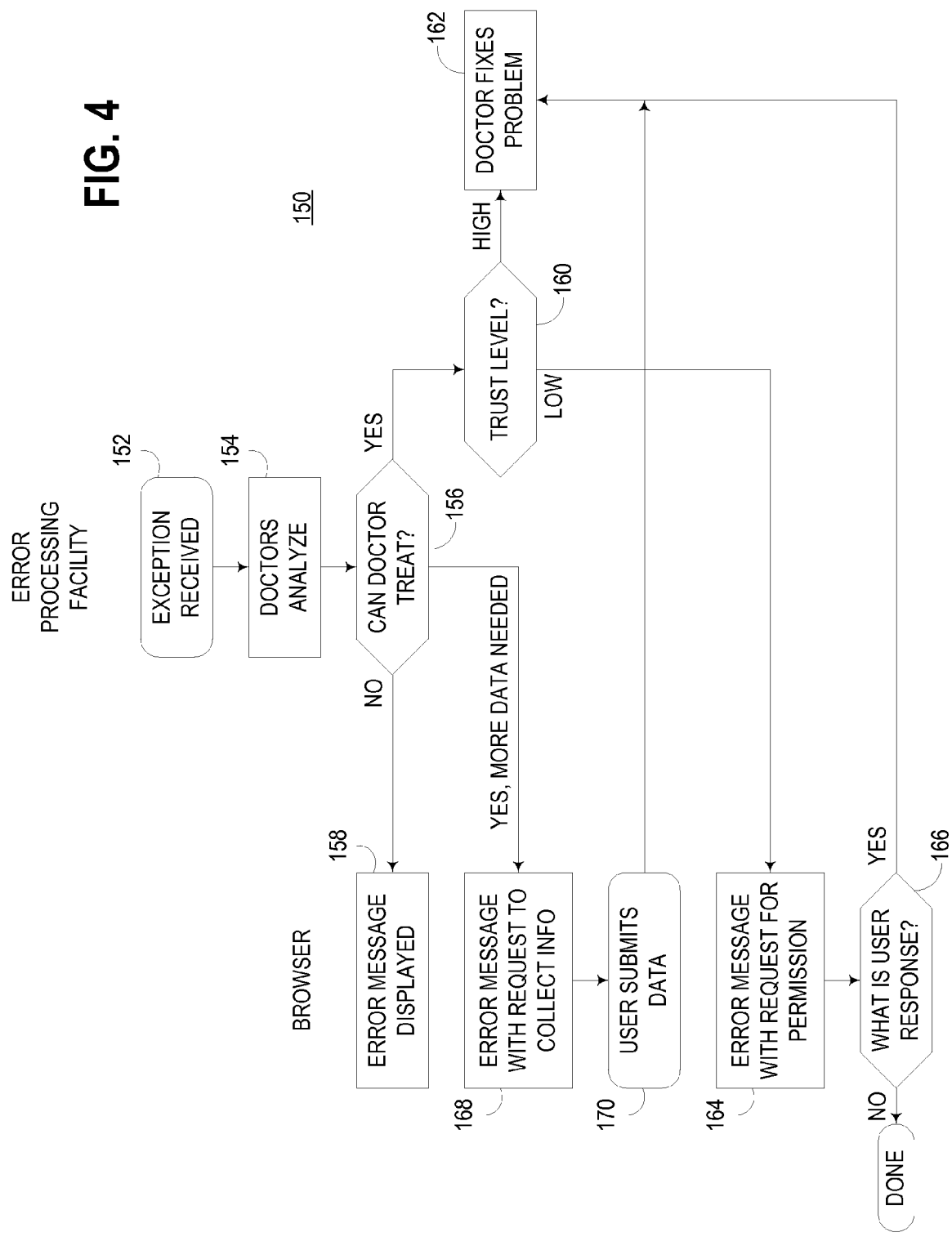
FIG. 4 is a flowchart illustrating the interaction between components in connection with prescribing and executing a treatment in the distributed computing environment of FIG. 2.

FIG. 4 next illustrates via process 150 the interaction between the various components in the aforementioned framework in connection with prescribing and executing a treatment in the distributed computing environment of FIG. 1 or 2. It is assumed in the process 150, as well as process 100 of FIG. 3, that the doctors are components within the error processing facility, and as such, the operations performed by a specific doctor are not broken out separately from the error processing facility in either FIG. 3 or FIG. 4. Also, in process 150, it is assumed that doctors may be assigned levels of trust, and that doctors may be able to fix a problem without user input in some situations, but also be able to interact with a user to obtain more information from the user when the situation warrants.

As such, process 150 begins in block 152 by receiving an exception object, in much the same manner as block 130 of FIG. 3. Next, the error processing facility routes the exception object to the set of active doctors in block 154, in much the same manner as block 132 of FIG. 3. Each doctor then analyzes the exception object, and returns an indication of whether the error condition is treatable (block 156). If no doctor returns a positive indication, control passes to block 158 to display an error message to the user, e.g., providing the error message wrappered in the exception object, or providing a generic error message.

If, on the other hand, a doctor indicates that the error condition is treatable, control passes to block 160 to determine a trust level for the doctor. In this embodiment, doctors may be classified as high trust doctors that do not require prior authorization from a user to perform a corrective action, or low trust doctors that require prior authorization from a user before performing a corrective action. As such, if the doctor is a high trust doctor, control passes to block 162, whereby the doctor fixes the problem. Otherwise, control passes to block 164 to prompt the user to provide authorization to perform the corrective action. For example, the request for authorization may be displayed along with an error message and a button or other user interface control suitable for a user to provide an indication of authorization. Block 166 then determines what the user response is. If the response is to deny authorization, no further action by the doctor is undertaken. If the response is to grant authorization, however, control passes to block 162, where the doctor proceeds to fix the problem.

Returning to block 156, if a doctor indicates that the error condition can be treated, but that more information is required before a corrective action can be undertaken, control passes to block 168 to display an error message to the user along with a request to the user for more information. In response to the message, the user submits the additional data in block 170, whereby control then passes to block 162, where the doctor proceeds to fix the problem using the additional information provided by the user.

As such, it can be seen that the types of operations that a doctor can undertake in connection with diagnosing, prescribing a treatment, and executing a treatment can vary depending upon the type of error condition being handled. It will be appreciated that the particular manner in which a doctor attempts to diagnose an error condition, as well as the particular manner in which a doctor attempts to address an error condition through the prescription of a treatment, is often highly dependent upon the underlying error condition and the symptomatic data provided therewith, and will often vary considerably in different situations. It will also be appreciated that the implementation of an error processing facility, along with appropriate user interface components, doctors, and other program code utilized in the aforementioned framework, would be well within the abilities of one of ordinary skill in the art having the benefit of the instant disclosure.

Figure 5:
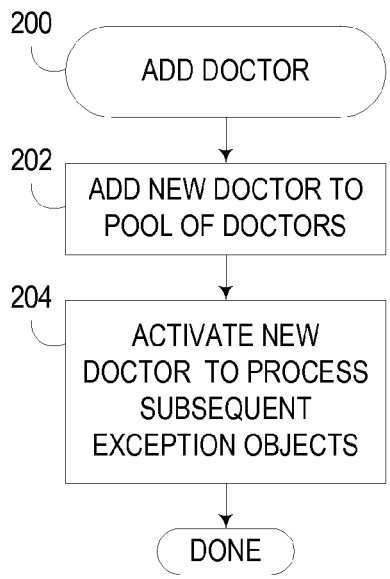
FIG. 5 is a flowchart illustrating an exemplary process for dynamically adding a diagnostic agent in the distributed computing environment of FIG. 2.

An automated error reporting and diagnosis framework consistent with the invention may include additional features in some embodiments. For example, as shown via process 200 of FIG. 5, a framework consistent with the invention may support the ability to dynamically add doctors to the set of active doctors that process error conditions. The addition of a doctor may be performed by a developer, a vendor, a system administrator, a customer, etc., and is generally performed by adding the doctor to the pool of active doctors (block 202). Once added, the new doctor is then activated (e.g., by registering the doctor with the error processing facility) so that subsequent exception objects received by the error processing facility will be routed to the new doctor. It will also be appreciated that doctors may be modified, updated, or deleted dynamically as well in some embodiments consistent with the invention.

Figure 6:
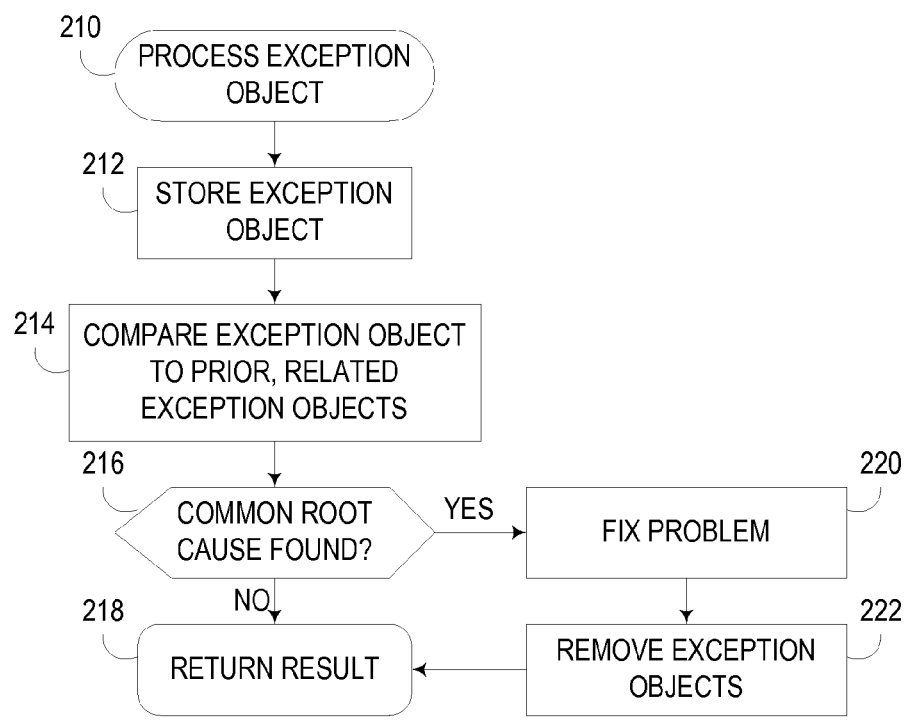
FIG. 6 is a flowchart illustrating an exemplary process for processing exception objects with a diagnostic agent in the distributed computing environment of FIG. 2.

Another feature that may be supported in a framework consistent with the invention is the processing of multiple exception objects to attempt to ascertain a common root cause of multiple exception conditions, e.g., as illustrated via process 210 of FIG. 6. In process 210, exception objects received by a doctor are first stored in block 212, e.g., within a cache. The current exception object is then compared to other stored exception objects in block 214 to attempt to ascertain a common root cause. If no common root cause is found, block 216 passes control to block 218 to return a result to the error processing facility indicating that the problem is not treatable at the current time. However, the exception object is still stored in case other related exception objects are subsequently received.

If, on the other hand, a common root cause is found, block 216 passes control to block 220 to fix the problem, in the general manner described above. Then, in block 222, any exception objects that are associated with the problem are optionally removed from the cache, whereby control then passes to block 218 to return this result to the error processing facility. Process 210 is then complete. As such, doctors may analyze multiple exception objects to attempt to ascertain any problems that are common to such exception objects. In instances where a particular system problem can generate a large number of error conditions from a variety of endpoints, the collective analysis of exception objects may be useful in reducing the number of error conditions seen by a user, and enabling multiple error conditions to be addressed at the same time.

The implementation of a framework to incorporate the aforementioned functionality would be well within the abilities of one of ordinary skill in the art having the benefit of the instant disclosure. For example, in one implementation, a Java ErrorMessageHelper class within an error processing facility may be configured to dynamically instantiate a set of AbstractMessageDoctor classes, functioning as doctors, which implement a generic interface for error message analysis and treatment.

Each AbstractMessageDoctor class may include an isTreatable method that is called by an ErrorMessageHelper instance, receiving as a parameter an exception object, defined by an EsuMessage class, which includes a globalized message along with an EsuEpisode object having additional symptomatic data. Each AbstractMessageDoctor instance may be configured to return an instance of an AbstractMessagePrescription class, or if no prescription is available, an indication that no prescription is available from that doctor. The AbstractMessagePrescription instance returned by an AbstractMessageDoctor instance may include methods that may be invoked by the ErrorMessageHelper instance to create a message box or dialog box in a secondary user interface in the management console application.

One such method is a getCustomTreatmentMessage( ) method, which returns a locale-specific message depending on how the doctor thinks it can correct the problem. This message is intended to be displayed to the user instead of the message contained in the original exception object. Another such method is a getTreatmentButtonLabels( ) method, which describes one or more buttons that should be presented to a user for the treatment to take place under the direction of an AbstractMessageDoctor instance. Yet another such method is a getTreatmentHandlers( ) method, which identify handler methods that can be invoked when the buttons in the message box are pressed by a user to collect additional information from the user to fix the problem.

The ErrorMessageHelper instance, in response to the reception of a prescription, invokes the aforementioned methods to build a custom message box displaying a message, and potentially one or more buttons that can be selected by a user in connection with executing the prescribed treatment. A user can then click on one or more of the buttons presented to the user to take corrective action. When the user completes the dialog a MessageTreatedEvent event may be fired containing the result of the treatment. In addition, if treatment listening is supported, endpoint components may be permitted to register with a MessageTreatedListener object, such that an endpoint component may be notified and can take additional action if necessary (e.g. to retry the operation that caused the error in the first place).

Various additional modifications may be made to the illustrated embodiments without departing from the spirit and scope of the invention. Therefore, the invention lies in the claims hereinafter appended.

What is claimed is:

1. A method of processing errors in a distributed computing environment, the method comprising:

managing a plurality of components in the distributed computing environment using a management console application interfaced with the plurality of components through a plurality of plug in, component-specific user interface components installed in a generic automated error reporting and diagnostic framework;

in response to an error detected in a first component from among the plurality of components in the distributed computing environment, encapsulating symptomatic data associated with the error;

routing the encapsulated symptomatic data to an error processing facility in the generic automated error reporting and diagnostic framework using a component-specific user interface component from among the plurality of component-specific user interface components that is associated with the first component;

performing diagnosis on the error by routing the encapsulated symptomatic data received by the error processing facility to at least one diagnostic agent from among a plurality of plug in diagnostic agents installed in the generic automated error reporting and diagnostic framework, wherein the plurality of plug-in diagnostic agents have varied domain specific knowledge; and processing the symptomatic data in the at least one diagnostic agent to prescribe a treatment for the error.

2. The method of claim 1, further comprising executing the prescribed treatment for the error using the at least one diagnostic agent.

3. The method of claim 2, wherein executing the prescribed treatment for the error using the at least one diagnostic agent is performed without soliciting user authorization to execute the prescribed treatment.

4. The method of claim 2, wherein executing the prescribed treatment for the error using the at least one diagnostic agent includes soliciting user authorization before executing the prescribed treatment.

5. The method of claim 2, wherein executing the prescribed treatment for the error using the at least one diagnostic agent includes interacting with a user via at least one user interface control displayed to the user.

6. The method of claim 5, wherein interacting with the user via the at least one user interface control includes soliciting the user for additional information required to execute the prescribed treatment.

7. The method of claim 5, wherein the management console application implements a web-based user interface accessible via a web browser, and wherein interacting with the user via the at least one user interface control includes running a secondary user interface within a web page communicated to the web browser by the management console application, the secondary user interface under the control of the at least one diagnostic agent.

8. The method of claim 2, wherein executing the prescribed treatment for the error includes accessing a dynamically modifiable trust assigned to the at least one diagnostic agent to determine whether the at least one diagnostic agent is required to solicit user authorization before execution the prescribed treatment.

9. The method of claim 2, further comprising notifying a listener associated with the first component in association with executing the prescribed treatment for the error.

10. The method of claim 1, wherein processing the symptomatic data in the at least one diagnostic agent to prescribe the treatment for the error includes interacting with a user to solicit additional symptomatic data from the user.

11. The method of claim 1, further comprising dynamically activating a plug in diagnostic agent to perform diagnosis on the error.

12. The method of claim 11, wherein the at least one diagnostic agent is developed by a customer or third party vendor that is separate from a developer of the generic automated error reporting and diagnostic framework.

13. The method of claim 1, wherein encapsulating the symptomatic data associated with the error includes encapsulating the symptomatic data in an exception object.

14. The method of claim 13, wherein processing the symptomatic data in the at least one diagnostic agent to prescribe the treatment for the error includes processing symptomatic data encapsulated in a plurality of exception objects to identify a common root cause of a plurality of errors associated with the plurality of exception objects.

15. The method of claim 1, wherein the symptomatic data includes an error message associated with the error and generated by the first component.

16. The method of claim 1, wherein performing diagnosis on the error includes routing the encapsulated symptomatic data received by the error processing facility to at least two diagnostic agents from among the plurality of plug in diagnostic agents installed in the generic automated error reporting and diagnostic framework and having different domain specific knowledge from one another.

17. An apparatus, comprising:

at least one processor; and program code configured to be executed by the at least one processor to manage a plurality of components in a distributed computing environment using a management console application interfaced with the plurality of components through a plurality of plug in, component-specific user interface components installed in a generic automated error reporting and diagnostic framework, receive in an error processing facility in the generic automated error reporting and diagnostic framework encapsulated symptomatic data associated with an error detected in a first component among the plurality of components in the distributed computing environment, perform diagnosis on the error by routing the encapsulated symptomatic data received by the error processing facility to at least one diagnostic agent from among a plurality of plug in diagnostic agents installed in the generic automated error reporting and diagnostic framework, and process the symptomatic data in the at least one diagnostic agent to prescribe a treatment for the error, wherein the encapsulated symptomatic data associated with the error is routed to the error processing facility by a component-specific user interface component from among the plurality of component-specific user interface components that is associated with the first component, and wherein the plurality of plug-in diagnostic agents have varied domain specific knowledge.

18. The apparatus of claim 17, wherein the program code is configured to perform diagnosis on the error by routing the encapsulated symptomatic data received by the error processing facility to multiple diagnostic agents having varied domain specific knowledge from among the plurality of diagnostic agents.

19. The apparatus of claim 17, wherein the program code is further configured to execute the prescribed treatment for the error using the at least one diagnostic agent.

20. The apparatus of claim 19, wherein the program code is configured to selectively execute the prescribed treatment for the error using the at least one diagnostic agent without soliciting user authorization to execute the prescribed treatment based upon a trust associated with the diagnostic agent, and wherein the program code is configured to execute the prescribed treatment for the error only after soliciting user authorization before executing the prescribed treatment if the trust associated with the diagnostic agent does not permit the prescribed treatment to be performed without soliciting user authorization.

21. The apparatus of claim 19, wherein the program code is configured to execute the prescribed treatment for the error using the at least one diagnostic agent by interacting with a user via at least one user interface control displayed to the user.

22. The apparatus of claim 21, wherein the program code is configured to interact with the user via the at least one user interface control by running a secondary user interface within an application, the secondary user interface under the control of the at least one diagnostic agent.

23. The apparatus of claim 17, wherein the program code is configured to process the symptomatic data in the at least one diagnostic agent to prescribe the treatment for the error by interacting with a user to solicit additional information from the user required to execute the prescribed treatment.

24. A program product, comprising:
program code configured to manage a plurality of components in a distributed computing environment using a management console application interfaced with the plurality of components through a plurality of plug in, component-specific user interface components installed in a generic automated error reporting and diagnostic framework, receive in an error processing facility in the generic automated error reporting and diagnostic framework encapsulated symptomatic data associated with an error detected in a first component among the plurality of components in the distributed computing environment, perform diagnosis on the error by routing the encapsulated symptomatic data received by the error processing facility to at least one diagnostic agent from among a plurality of plug in diagnostic agents installed in the generic automated error reporting and diagnostic framework, and process the symptomatic data in the at least one diagnostic agent to prescribe a treatment for the error, wherein the encapsulated symptomatic data associated with the error is routed to the error processing facility by a component-specific user interface component from among the plurality of component-specific user interface components that is associated with the first component, and wherein the plurality of plug-in diagnostic agents have varied domain specific knowledge; and a recordable computer readable medium storing the program code.

25. A method of processing errors in a distributed computing environment, the method comprising:
managing a plurality of components in the distributed computing environment using a management console application interfaced with the plurality of components through a pool of plug in, component-specific user interface components installed in a generic automated error reporting and diagnostic framework, wherein the plurality of component-specific user interface components are implemented as Java-compatible portlets;

in response to an error detected in a first component from among the plurality of components in the distributed computing environment, encapsulating symptomatic data associated with the error using a exception utility including an exception wrapper and a treatment listener;

routing the encapsulated symptomatic data to an error processing facility in the generic automated error reporting and diagnostic framework using a component-specific user interface component from among the plurality of component-specific user interface components that is associated with the first component;

performing diagnosis on the error by routing the encapsulated symptomatic data received by the error processing facility to a plurality of diagnostic intelligent agents from among a pool of plug in diagnostic intelligent agents installed in the generic automated error reporting and diagnostic framework, wherein the plug-in diagnostic intelligent agents in the pool of plug in diagnostic intelligent agents have varied domain specific knowledge;

processing the symptomatic data in the plurality of diagnostic agents to prescribe a treatment for the error;

dynamically modifying the pool of plug in, component-specific user interface components by adding or removing a component-specific user interface component during execution of the generic automated error reporting and diagnostic framework; and dynamically modifying the pool of plug in diagnostic intelligent agents by adding or removing a diagnostic intelligent agent during execution of the generic automated error reporting and diagnostic framework.

* * * * *